United States Patent
Hsiao

(10) Patent No.: US 11,858,212 B2
(45) Date of Patent: *Jan. 2, 2024

(54) METHOD AND APPARATUS FOR 3D PRINTING

(71) Applicant: University of South Alabama, Mobile, AL (US)

(72) Inventor: Kuang-Ting Hsiao, Spanish Fort, AL (US)

(73) Assignee: University of South Alabama, Mobile, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,548

(22) Filed: Jul. 25, 2022

(65) Prior Publication Data

US 2023/0014673 A1    Jan. 19, 2023

Related U.S. Application Data

(63) Continuation of application No. 16/336,031, filed as application No. PCT/US2017/052783 on Sep. 21, 2017, now Pat. No. 11,426,935.

(Continued)

(51) Int. Cl.
*B33Y 50/02* (2015.01)
*B29C 64/393* (2017.01)
(Continued)

(52) U.S. Cl.
CPC .......... *B29C 64/209* (2017.08); *B29C 64/118* (2017.08); *B29C 64/188* (2017.08);
(Continued)

(58) Field of Classification Search
CPC ..... B29C 64/118; B29C 64/188; B29C 64/20; B29C 64/205; B29C 64/209;
(Continued)

(56) References Cited

U.S. PATENT DOCUMENTS

| 4,942,013 A | * | 7/1990 | Palmer | ................ | B29C 43/3642 264/511 |
| 9,126,367 B1 | | 9/2015 | Mark et al. | | |

(Continued)

FOREIGN PATENT DOCUMENTS

| CN | 203945693 U | 11/2014 |
| CN | 104827033 A | 8/2015 |

(Continued)

OTHER PUBLICATIONS

Japan Patent Office "Notice of Rejection of JP Application No. 2021-066314" dated 2022, pp. 1-6.

(Continued)

*Primary Examiner* — Yuhui R Pan
(74) *Attorney, Agent, or Firm* — Nicholas J. Landau; Maynard Nexsen PC

(57) ABSTRACT

A printing head assembly for 3D printing and methods of using the same are provided. The printing head incorporates a backing means that can be shaped and positioned by use of an attractive force. This creates the possibility of embodiments in which the head can move in three dimensions, without the need to print each successive layer on the layer below. Methods of ensuring the security and integrity of the 3D printing process are also provided.

21 Claims, 3 Drawing Sheets

Related U.S. Application Data

(60) Provisional application No. 62/495,739, filed on Sep. 22, 2016.

(51) Int. Cl.

| | | |
|---|---|---|
| *B29C 64/209* | (2017.01) | |
| *B33Y 10/00* | (2015.01) | |
| *B33Y 30/00* | (2015.01) | |
| *B29C 64/264* | (2017.01) | |
| *B29C 64/118* | (2017.01) | |
| *B29C 64/379* | (2017.01) | |
| *B29C 64/245* | (2017.01) | |
| *B29C 70/38* | (2006.01) | |
| *B29C 64/20* | (2017.01) | |
| *B29C 64/205* | (2017.01) | |
| *B29C 64/188* | (2017.01) | |
| *B33Y 40/00* | (2020.01) | |

(52) U.S. Cl.
CPC ............ *B29C 64/20* (2017.08); *B29C 64/205* (2017.08); *B29C 64/245* (2017.08); *B29C 64/264* (2017.08); *B29C 64/379* (2017.08); *B29C 64/393* (2017.08); *B29C 70/382* (2013.01); *B33Y 10/00* (2014.12); *B33Y 30/00* (2014.12); *B33Y 40/00* (2014.12); *B33Y 50/02* (2014.12)

(58) Field of Classification Search
CPC ... B29C 64/245; B29C 64/264; B29C 64/379; B29C 64/393; B29C 70/382; B33Y 10/00; B33Y 30/00; B33Y 40/00; B33Y 50/02
See application file for complete search history.

(56) References Cited

U.S. PATENT DOCUMENTS

| | | | |
|---|---|---|---|
| 10,254,499 B1* | 4/2019 | Cohen | ............... H01R 4/024 |
| 2004/0060639 A1 | 4/2004 | White | |
| 2009/0173443 A1 | 7/2009 | Kozlak et al. | |
| 2013/0197683 A1* | 8/2013 | Zhang | ............... B22F 12/86 |
| | | | 700/96 |
| 2013/0215454 A1 | 8/2013 | Tan et al. | |
| 2014/0232035 A1 | 8/2014 | Bheda | |
| 2015/0145174 A1 | 5/2015 | Comb | |
| 2015/0183167 A1 | 7/2015 | Molinari et al. | |
| 2015/0220291 A1 | 8/2015 | Tapley et al. | |
| 2016/0042261 A1 | 2/2016 | Kieser | |
| 2016/0067925 A1* | 3/2016 | Warwick | ............. B29C 71/0009 |
| | | | 425/143 |
| 2016/0144565 A1* | 5/2016 | Mark | ................... B29C 64/106 |
| | | | 425/166 |
| 2016/0257074 A1 | 9/2016 | Levine et al. | |
| 2017/0066189 A1 | 3/2017 | Ur | |

FOREIGN PATENT DOCUMENTS

| | | |
|---|---|---|
| JP | H08203717 A | 8/1996 |
| JP | H1142712 A | 2/1999 |
| JP | 2016159630 A | 9/2016 |
| WO | 2009/079454 A1 | 6/2009 |
| WO | 2014/153535 A2 | 9/2014 |
| WO | 2015139095 A1 | 9/2015 |
| WO | 2015/193819 A2 | 12/2015 |
| WO | 2016/030782 A1 | 3/2016 |
| WO | 2016/033286 A1 | 3/2016 |

OTHER PUBLICATIONS

Whelan, Natalie "Supplementary European Search Report—EP application No. 17853923" European Patent Office; dated Apr. 6, 2020; pp. 1-5 dated Apr. 17, 2020.
China Patent Office "Office Action" pp. 1-5; Oct. 10, 2020.
Japan Patent Office "Notice of Rejection of JP Application No. 2019-537048" dated Oct. 6, 2020, pp. 1-2.
Extended European search report received for European patent application No. 22164588.0, dated Jul. 15, 2022, 06 pages.
First Office Action received for Chinese patent application No. 202110997837.8, dated Nov. 11, 2022, 8 pages including English translation.
Search report received for Chinese patent application No. 201780058375.5, dated Sep. 24, 2020, 01 page.
Search report received for Chinese patent application No. 202110997837.8, dated Nov. 4, 2022, 2 pages.
Second Office Action received for Chinese patent application No. 201780058375.5, dated Apr. 1, 2021, 7 pages including English translation.
International Search Report and Written Opinion received for International patent application No. PCT/US2017/052783, dated Dec. 29, 2017, 07 pages.
Search report received for Japanese patent application No. 2021-066314, dated Feb. 24, 2022, 17 pages including English translation.
International preliminary report on patentability received for International patent application No. PCT/US2017/052783, dated Apr. 4, 2019, 07 pages.

* cited by examiner

PRIOR ART

METHOD AND APPARATUS FOR 3D PRINTING

CROSS-REFERENCE TO RELATED APPLICATIONS

This application is a continuation of U.S. patent application Ser. No. 16/336,031, filed 22 Mar. 2019 (issued as U.S. Pat. No. 11,426,935); which is a national stage of PCT/US2017/052783, filed 21 Sep. 2017; which cites the benefit of U.S. Provisional Patent Application No. 62/495,739 filed on 22 Sep. 2016. The contents of each of the foregoing as filed are incorporated herein by reference in their entireties.

FIELD OF THE DISCLOSURE

The present disclosure relates to a novel 3D printing head and novel 3D additive manufacturing process enabled by the novel printing head. The system and method will address many desired features of 3D printing.

BACKGROUND OF THE DISCLOSURE

Additive Manufacturing (AM) vs. Subtractive Manufacturing (SM)

Additive manufacturing (AM) takes the contrast concept rather than the traditional "subtractive manufacturing (SM)" approaches. In a traditional SM process, a bulk of material is machined (e.g., cutting, drilled, milling, etc.) and a portion of the bulk material is removed to form the desired geometry of the part. In the AM process, the raw material is added layer-by-layer to form the desired geometry of the part. The AM processes include many different processes and are still developing. Generally speaking, AM processes compared with the SM processes, provide materials savings and can produce more complex shapes. In many situations, AM also reduces cost for small production (such as prototyping) since no special tooling investment and development is necessary. On the other hand, the parts processed by AM processes are typically weaker than the parts processed by SM processes due to materials being used and the defects produced during AM processes. Furthermore, there are many limitations of AM processes that make them not completely accepted by manufacturing industries. Nevertheless, the potential of AM is significant and researchers are interested in improving the AM processes. Generally speaking, although there are varieties of AM processes, they can be categorized into four distinct classes.

Classes of Additive Manufacturing Processes

Stereolithography (SLA): The first class of AM was first realized in 1980s with the stereolithography invented by Charles Hull for rapid prototyping (RP) purposes. For SLA, a photocurable resin, in the liquid phase, is held by a reservoir. A movable platform is placed inside the reservoir and originally submersed in the photocurable resin. A light source, such as a laser beam or UV light, is applied to the platform with a desired 2D printing pattern to cure a thin layer of resin on the platform. The platform is then moved a very small distance away for the light source and the light source is then reapplied to cure and deposit the next 2D layer of resin on top of the exiting cured resin layer. By gradually changing the light source's printing pattern, one can change the patterns of the 2D printed resin layers to progressively form the desired 3D part geometry once the deposition of all 2D layers is completed. If the light source is placed above the reservoir, the platform should be gradually moving downward during the SLA process; this is called top-down printing. On the other hand, if the light source is under the reservoir (the reservoir has a glass bottom), the platform is gradually moving upward during the SLA process. SLA has very excellent resolution that can be controlled within about 100 nm. However, the selection of photocurable polymers for use in SLA is very limited. Thus, the materials that can be processed by SLA are also very limited. Moreover, the light scanning direction and the z-stacking process may cause anisotropy behavior of the SLA printed parts and introduces the voids.

Powder-Based Additive Manufacturing (PB-AM): The second class of AM is powder-based AM, which encompasses three slightly different AM processes, i.e., Three-Dimensional Printing (3DP), Selective Laser Sintering (SLS), and Laser Engineering Net Shaping (LENS). In a 3DP process, a powder bed is first placed in a platform, then a liquid binder is ink-jet printed on the powder to bind the powder at selected position to form a 2D pattern layer. A roller is used apply the next layer of powder above the printed layer and then the binder is ink-jet printed again to bind another layer of powder to form anther 2D pattern on top of the previous 2D pattern layer. By gradually adding 2D printed layers, a 3D part is eventually formed and embedded inside the powder bed. To strengthen the binding in a 3DP process, post heating may be needed. The powder used in a 3DP process could be from metals, ceramics, polymers, etc. However, the rough surface finish and low resolution are known drawbacks. Selective Laser Sintering (SLS) is the binder-less version of 3DP. In SLS, a high energy laser beam is used to sinter the powder particles locally thereby fusing them to form a 2D pattern layer similar to the 3DP process. The powder materials to be used in the SLS are more limited since they must be able to support the sintering step. Electron beams can be used to substitute the laser beam if the powder requires a higher melting temperature. In SLS, the surface quality is typically better than 3DP but less than SLA. A variation of the SLS is the Laser Engineered Net Shaping (LENS) that uses a nozzle to spread powder on a substrate and replace the use of a powder bed. If the substrate is a damaged part, the LENS process can also be used to repair the damaged part.

Materials Extrusion-based Additive Manufacturing (MEB-AM): The most well-known process in the class of MEB-AM is the Fused Deposition Model (FDM). In this process, a plastic filament is fed into the extrusion head that melts the filament and extrudes and deposits a bead of molten filament material on a flat substrate. The molten bead is then quickly cooled to a solid state. Continuing the deposition process, a 2D layer is progressively formed on the substrate. By sequentially depositing many 2D layers on top of each other, a 3D part is ultimately formed. Due to voids between the layers of beads, the parts formed by MEB-AM are highly anisotropic and their mechanical properties are highly dependent on the processing parameters. Typical materials being printed by MEB-AM can be poly polyphenylsulfone (PPSU), polyetheretherketone (PEEK), and polyaryletherketone (PAEK).

Materials Jetting Additive Manufacturing (MJ-AM): This method uses an Inkjet's printer head to print photocurable resin layers, which are stacked up on a flat substrate. Each photocurable resin layer is cured by a light source (such as UV, laser, etc.) before the next layer being deposited atop. This process has issues with regards to the photocurable resin chemistry and inhomogeneous curing.

Issues and Challenges of Existing Additive Manufacturing (AM) Processes

The use of AM processes is still developing but their shortfalls compared with parts manufactured with traditional subtractive manufacturing (SM) processes are also being more closely examined by current users and people interested in considering the AM processes.

Economically, there is typically a much higher per unit production cost from the AM processes compared with traditional SM processes. Also, the AM process are typically slower than SM for mass production. However, economics may favor the AM processes for prototyping or specialty part production when SM is not suitable. In this regard, if the part is complex and expensive and only a small quantity is needed, AM will tend to be more suitable than SM.

In addition to the economic considerations, current AM processes have a technical problem compared with SM processes which may disqualify the AM parts for many critical load bearing components. Specifically, the material strength of AM parts may be reduced due to the voids and defects (such joining boundary lines or weld lines between beads deposit on top of each other). All AM processes take the layer-by-layer deposition process. Thus, the joining boundary between two layers will always experience slightly different process conditions and history in comparison to the material at the center of each layer. Moreover, air, moisture, dust, oil, process induced stresses, and temperature history, light source exposure history will all cause the joining boundary being different than the core of each layer. The presence of voids is also a well-known problem with traditional AM parts. Many photomicrographs taken by different researchers using different AM processes have shown significant voids in AM produced parts. For example, it has been shown that the surface tension of a melted polymer bead always makes the bead surface a convex shape during the bead cooling process. Thus, when the beads forming the next layer are applied on top of the convex shaped bead surface, a generally triangular shape void is formed. By way of example, FIG. 1 shows the geometrical relation between the polymer beads and the triangle voids in a FDM (i.e, Fused Deposition Modeling) part. The void size is of the similar order of magnitude as the diameter or cross-section of the bead. Such void formation is one of the reasons that AM parts may be weaker than SM parts. Such weakness may be particularly pronounced in the layer stacking direction. Other factors such as residual stress of fast curing or fast cooling of a fine bead or UV curing can also change the materials' properties. As a result, AM parts tend to be weaker in the stacking direction. In addition, AM parts are also typically less durable than SM parts when facing fatigue loading and environmental aging.

Another technical issue is the ability to use fiber reinforced materials in AM processes. Since AM processes utilize layer-by-layer deposition on a flat substrate, one approach is to mix short carbon fibers in the polymer and make the short fiber reinforced polymer parts by the FDM process. In this approach, the bead extrusion process of FDM will align the short fibers during the extrusion process and the extruded bead is highly anisotropic. However, the fiber cannot be too long otherwise it will clog the extruder head. This limitation on fiber length is restrictive in some applications since a long continuous fiber is a significantly better reinforcement than a short fiber.

Despite the advances which have been made, one should note that even in well aligned short carbon fiber reinforced polymer composites, the mechanical properties are still about an order of magnitude less than the traditional continuous carbon fiber reinforced polymer composites. In addition, none of the reported works show the solution to reduce the void issue induced by the fundamentals of layer-by-layer FDM process. The occurrence of such voids will cause non-uniform properties, weak against fatigue, and significantly lower environmental resistance and durability.

SUMMARY OF THE DISCLOSURE

Referring to the drawings, the present disclosure provides advantages and alternatives over the prior art by providing a printing head assembly for 3D printing and methods of using the same. The printing head incorporates a backing means that can be shaped and positioned by use of an attractive force. This creates the possibility of embodiments in which the head can move in three dimensions, without the need to print each successive layer on the layer below.

In a first aspect, a printing head for a 3D printing assembly is provided, comprising: a backing means; a means for extruding a filament containing an unsolidified printing material on a substrate; a means for compressing the filament against the surface of the substrate; a means for pressing the substrate toward said means for compressing; a means for dynamically altering the shape of the means for pressing; and a means for advancing the printing head relative to the filament upon solidification of the composite.

In a second aspect, a printing head for a 3D printing assembly is provided comprising: a filament output port connected to receive an unsolidified printing material from a feedstock processor and extrude a filament onto a substrate; a pressing surface positioned to contact the filament once the filament is extruded; a field emitter configured to emit a field to attract a backing article toward the pressing surface to compress the filament between the substrate and the pressing surface.

In a third aspect, a 3D printing system for printing a workpiece is provided, the system comprising: either of the printing heads above; and a first anchor unit configured to clamp the filament between a clamping surface and a coupling pad on said anchor unit, the anchor unit comprising an anchor position controller configured to maintain a position of the anchor unit relative to the printing head.

In a fourth aspect, a method of producing a workpiece by 3D printing is provided, the method comprising: extruding a filament comprising an unsolidified printing material from a 3D printing head onto a substrate; emitting an attractive field to attract a backing article so as to compress the filament between the substrate and a pressing surface; solidifying the unsolidified composite material to create a solid printing material; and advancing the 3D printing head relative to the filament.

In a fifth aspect, a method of repairing a workpiece using a 3D printing head is provided, the method comprising: extruding an unsolidified printing material from a 3D printing head onto a damaged area of the workpiece; emitting an attractive field to attract a backing article so as to compress the unsolidified printing material between the substrate and a pressing surface; solidifying the unsolidified printing material to create a solid printing material; and advancing the 3D printing head relative to the workpiece.

In a sixth aspect, a workpiece that has been repaired according to the repair method above is provided, wherein the workpiece comprises a composite material having plurality of fibers of at least 1 mm in length in a solidified matrix.

In a seventh aspect, a 3D printed workpiece composed of a composite material is provided, said composite material comprising a plurality of fibers and a matrix, comprising an embedded ID module containing an ID number configured to be read by a remote sensor.

In an eighth aspect, a 3D printed workpiece composed of a composite material is provided, said composite material comprising a plurality of fibers and a matrix, comprising an embedded ID module configured to respond to a signal.

In a ninth aspect, a method of verifying the intellectual property compliance in a 3D printed workpiece is provided, the method comprising: printing an ID module in the workpiece during the printing of the workpiece using a 3D printer; reading the ID module to obtain an ID code; transmitting the ID code to an authentication server; and receiving an authentication signal from the authentication server indicating positive or negative authentication.

In some embodiments of the 3D printing head, the localized pressing unit and the localized field emitter operate in a coordinating manner. In one exemplary aspect of the present disclosure, the localized pressing unit may further comprise at least one localized pressing pad having at least one localized pressing surface operating in a coordinating manner. In an additional exemplary aspect of the present disclosure, the localized field emitter may be capable of emitting a field substantially perpendicular to the localized pressing surface 6. In an additional exemplary aspect of the present disclosure, the field emitted by the localized field emitter may induce the localized force to pull at least one backing article relatively toward the localized pressing surface 6. In an additional exemplary aspect of the present disclosure, at least one new filament 9 may be extruded from the filament output port and is directed through a space between the localized pressing surface 6 and the backing article in a manner such that the new filament's shape and position is controlled by the pressing surface and the backing article. In an additional exemplary aspect of the present disclosure, the assembly may be equipped with at least one cutter 1 1, the cutter working in conjunction with the printer head to cut the new filament as necessary. Finally, in an additional exemplary aspect of the present disclosure, the printing head assembly may be equipped with at least one tensioner, the tensioner being capable of controlling resistance against the new filament.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

The present disclosure is directed to a novel additive manufacturing (i.e., 3D printing) method and apparatus. In accordance with one exemplary feature, a method and apparatus consistent with the present disclosure provides the ability to build a layer-by-layer deposited structure without requiring a platform or a support medium chamber.

In accordance with another exemplary feature a method and apparatus consistent with the present disclosure may be used to control the printing (deposition) direction in 3D directions like the 6-axis printing or 7-axis printing or higher degrees of 3D printing without the need for a mold (either temporary scaffold of support material or a durable mold tool).

In accordance with another exemplary feature, a method and apparatus consistent with the present disclosure maybe used to increase the stacking-direction strength compared to traditional AM processes. All current AM processes are layer-by-layer deposition despite the use of powder, liquid, ink, melted materials, etc. The layer-by-layer addition process introduces defects, e.g., voids, residual stress, etc. These types of defects are likely to appear in all current AM processes despite that the deposition direction is x, y, or z.

In accordance with another exemplary feature, a method and apparatus consistent with the present disclosure may be used to print various materials such as continuous fiber reinforced composites, discontinuous fiber reinforced composites, as well as materials without fiber reinforcement. In contrast, the current AM processes (like the FDM) have the disadvantage of only being able to print short discontinuous fiber reinforced composites or/and materials without fiber reinforcement due to the manufacturing issues as previously mentioned.

A Novel Free-Form Curved-Structure (FFCS) Printing Head

Figure 1:
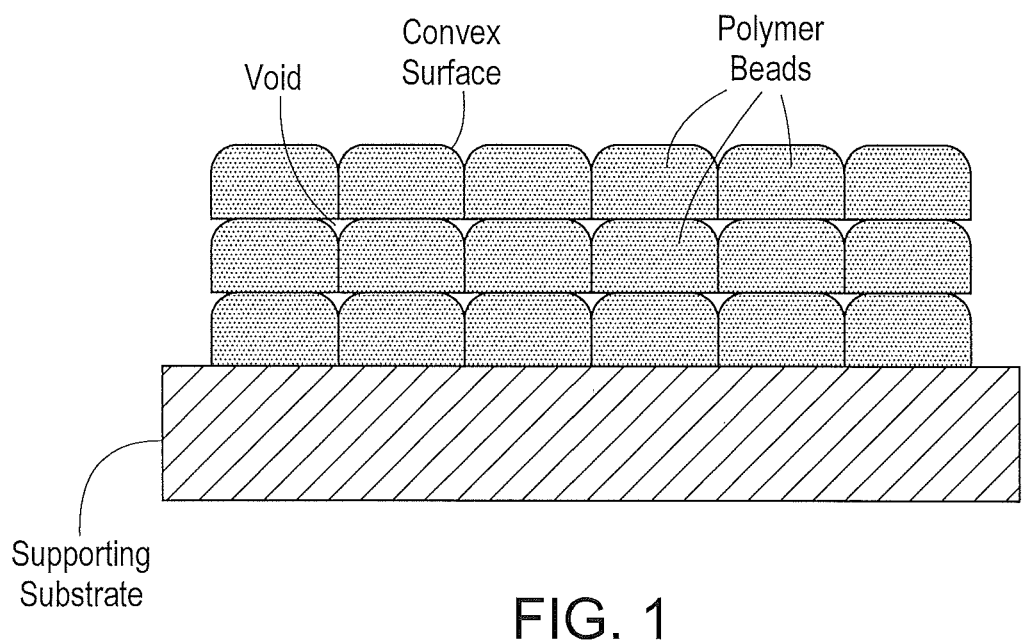
FIG. 1 shows the geometrical relation between the polymer beads and the triangle voids in a prior art fused deposition modeling part.
Figure 2:
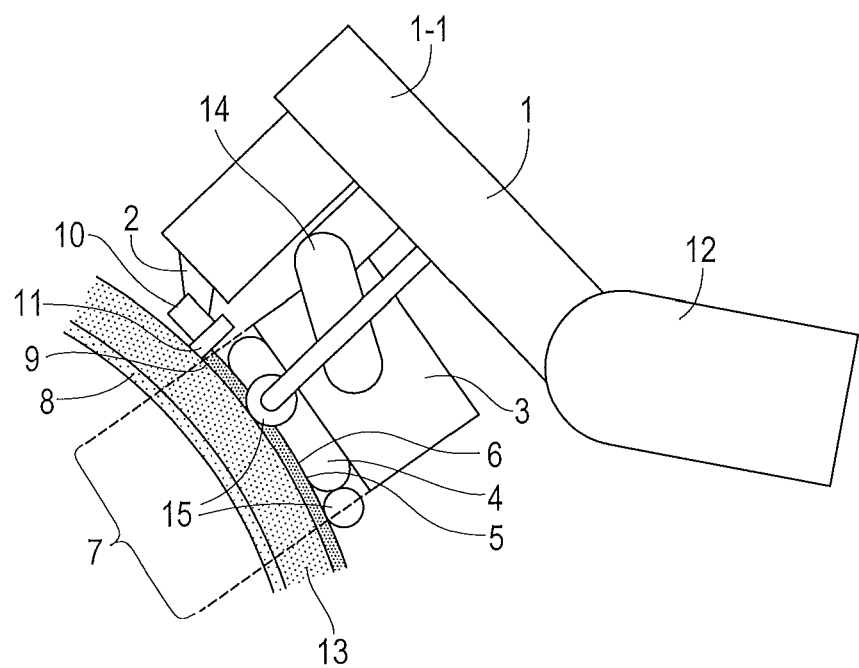
FIG. 2 is an illustration of an embodiment of the printing head. It is for illustration and explanatory purposes only but not for limitation.

FIG. 2 is an illustration of an exemplary embodiment of the 3D printing head: a free-form curved-structure (FFCS) printing head. It is for illustration and explanatory purposes only but is not intended for limitation. The elements numbered in the FIG. 2 are:

Element 1: printing head.

Element 1-1: mechanism to receive and process the incoming feedstocks including, but not limited to, polymer filament, fiber tow, micro-particles, nanoparticles, ink, or any combination thereof.

Element 2: filament output port; which is part of the printing head 1. A printing head 1 can have one or more than one of filament output ports.

Element 3: localized field emitter; which is part of the printing head 1. A printing head 1 can have one or more than one of localize field emitters.

Element 4: localized pressing unit; which is part of the printing head 1. A printing head 1 can have one or more than one of localize pressing units.

Element 5: localized pressing pad; which is associated with the localized pressing unit 4. A localized pressing unit 4 can have one or more than one of localize pressing pads.

Element 6: localized pressing surface; which is associated with the localized pressing pad 5. A localized pressing pad can have one or more than one of localize pressing surfaces. For example, but not to limit the possible configurations, the pressing pad 5 can contain different sub areas that can have different shapes and can have channels between the sub areas. The pressing pad 5 may also contain some moving parts including, but not limited to, ball rollers or cylinder rollers to reduce the friction.

Element 7: field emitted by the localized field emitter 3.

Element 8: backing article; which is responsive to the field 7 and can work together with field 7 to generate field-induced force on the backing article 8. At least one backing article can be used to associate with a field 7.

Element 9: new filament, which is extruded from the filament output port 2; the new filament 9 is used to form the latest layer of deposition of the 3D part.

Element 10: tensioner.

Element 1: cutter to cut the new filament 9.

Element 12: printing head position control mechanism such as a robot arm to control the position (coordinates & angles) of the printing head 1.

Element 13: existing deposition layer(s) of a 3D part. For example, but not limited to, an existing deposition layer can be established by layer-by-layer deposition of the new filament 9 layers.

Element 14: relative position controller to control the relative position of The localized pressing unit 4 with respect to the printing head 1.

Element 15: assistant rollers of the printing head 1.

The operational concept of the novel printing head 1 can be explained with the help of using FIG. 2, wherein FIG. 2 is for explanation purposes only but does not limit the scope and details of the disclosure. As illustrated in FIG. 2, the illustrated exemplary printing head 1 includes at least one filament output port 2, at least one connected localized field emitters 3, and at least one connected localized pressing unit 4. For the purposes of this application, the term "connected" means these elements are used, moved, and controlled coordinately. The connections between them can be direct attachment or indirectly associated with additional coordinated control mechanisms (such as but not limited to gear box, hydraulic cylinders, belt, actuators, or servos). In addition, the connection relation can be fixed or adjustable. It also has a mechanism 1-1 to receive and process the incoming feedstocks. Feedstocks suitable for use in the present disclosure include, but are not limited to polymer filaments, fiber tows, micro-particles, nanoparticles, inks, or any combination thereof. In the illustrated exemplary construction, the localized pressing unit 4 has at least one localized pressing pad 5. The localized pressing pad 5 has at least one localized pressing surface 6. A localized pressing surface 6 is defined as an effective contact surface of a localized pressing pad 5 with an object that is pressed against the localized pressing pad 5. For explanation purpose only, if an object is pressed against a localized pressing pad 5 that includes four flat sub-pads, there are four localized pressing surfaces. If a cylinder roller is used as the localized pressing pad 5 to press a relatively flat object, the localized pressing surface 6 is the small contact area between the cylinder roller and the relatively flat object. Note that for 3D printing practice, the localized pressing surface 6 is significantly smaller than the part to be printed by the printing head 1. Note the smaller the size of the localized pressing surface 6, the higher resolution of the printing head 1 has. By way of example only, and not limitation, the area of a localized pressing surface 6 may be less than $1/16^{th}$ of the surface area of the part to be printed. The localized field emitter 3 can emit at least one fields 7 approximately normal (i.e., perpendicular) to the localized pressing surface 6. The field 7 emitted by the localized field emitter 3 induces the localized force to pull one or more than one piece of backing articles 8 relatively toward the localized pressing surface 6. Note that an opposite field can also push the backing articles 8 relatively away from the localized pressing surface 6. Backing articles 8 suitable for use in the present disclosure include, but are not limited to, small steel balls, a continuous piece or multiple pieces of flexible rubber or polymer articles containing iron particles that are responsive to a magnetic field (a type of field 7) emitted by the localized field emitter 3 and are pulled towards the localized pressing surface 6, In the present disclosure, the position and shape of the localized pressing surface 6 are precisely controlled so as to play the role as a localized shaping tool surface to travel along the precise path that each new filament 9 is designed to be placed. This is done to precisely control the curvature of the new filament 9 being pressed under the localized pressing unit 4. As the new filament 9 just extruded from the filament output port 2 is quite flexible and can be shaped (i.e., unsolidified) (e.g., the FDM filament is melted when just extruded), precisely controlling the shape and position of the localized pressing surface 6 (or the assembly of multiple coordinated localized pressing surfaces 6) can be very effective in precisely controlling the desired surface shape (facing the localized pressing surface 6) and the position of the new filament 9 for fulfilling its role in the 3D printed part. It should be noted that the process-induced residual stress build-up or designed pre-loaded stress requirements may change the filament location and shape when the 3D part printing is completed or is used in the designed service. Accordingly, in a preferred practice, the location and shape design of the new filament placement during the disposition process should compensate such expected changes. Further, in a preferred embodiment, proper numerical simulations (such as finite element analysis) may be used to estimate such changes and factor the predicted changes into the part design. Also, as shown in FIG. 2, the field 7 emitted by the localized field emitter 3 is remotely interacting with the backing article 8. Hence, one can control the field 7 to adjust the field-induced force on the backing article 8 thereby effectively controlling the compression force exerted on the localized pressing surface 6 that is serving as the role of a localized shaping tool surface. This can define the local shape, location, and material compaction of a subject (such as but not limited to the new filament 9) being compressed against it.

In another exemplary system, one can turn off the field 7 to disengage the backing article 8 and the localized pressing surface 6. In another embodiment of the present disclosure, one can switch the direction of the field 7 to repel the backing article 8 away from the pressing surface 6. Examples of fields suitable for use in the present disclosure include, but are not limited to, a magnetic field, an electrostatic field, fluid pressure (such as vacuum pressure if there are appropriate channels to conduct the pressure induced force to the backing article 8), or any combination thereof. Note that by using multiple fields one can gain more control capability or transitioning/switching to different applicable fields in the event one field's effectiveness drops during the part printing process. By changing the field strength, one can control the localized material compaction and expansion of any subject inserted between the localized pressing surface 6 and the backing article 8.

Localized compaction control can help to control the desired local material properties, reduce the void contents, and also control the residual stresses or even preload the deformation of shape memory materials (such as shape memory polymers or shape memory alloys) while they are placed between the localized pressing surface 6 and the backing article 8. If there are fibers (e.g., carbon fibers) loaded in the new filament 9, with appropriate matrix removal mechanism associated with either the new filament 9 (like resin bleeding channels pre-manufactured in some FRP prepregs) or the localized pressing pad 5 or additional accessories to work with the printing head 1, one can control the field. Thereby controlling the compaction and removing the excessive matrix of the filament 9 through the matrix removal mechanism. This produces a high fiber volume fraction in the new filament 9. Examples of the matrix removal mechanism suitable for use in the present disclosure include, but are not limited to, resin flow channels or resin bleeding fabric connected to a low pressure container to collect the excessive resin matrix squeezed out from the new filament 9 by the localized pressing pad 5. Besides the material compaction control (and also the expansion control of expandable materials) in the normal direction of the localized pressing surface 6, it is also possible to control the tension/compression of a new filament 9 along the filament direction.

A tensioner 10 shown in FIG. 2 can control the resistance against the new filament 9 while being pulled from the filament output port 2 towards the localized pressing surface 6. Thus, the tension of the new filament 9 can also be controlled by the tensioner 10 while being compressed under the localized pressing surface 6. In addition, one can use two or more (i.e., multiple) sets of localized pressing surfaces 6 and backing articles 8 as clamps. By relatively moving and controlling the multiple clamps in a coordinated manner one can change the preloaded stress and deform the material layer between the clamps. This opens additional degrees of freedom to engineer the material properties locally. On another note, if the material layer contains at least one shape memory material such as shape memory alloy or shape memory polymer, such a material layer can be programmed locally by this pre-tension or pre-deformation approach during the printing process. By programming the shape memory material, a 4D part can also be printed by the printing head 1. The compaction can also help reduce the inter-filament void due to filament-stacking, which is a common defect in traditional FDM process.

A cutter 11 can be equipped to the printer head 1 to cut the new filament 9 as necessary. Cutters 11 suitable for use in the present disclosure include, but are not limited to, blades, lasers, or ultrasound cutters.

In the illustrated exemplary construction, the printing head 1 is attached to a printing head position control mechanism 12 such as a robot arm or a robot; note that the "position" of the printing head 1 refers to the "location" and "alignment" of the printing head 1. For explanation purposes only, in a 3D space, the location of an object can be presented as (x,y,z) coordinates and the alignment can be denoted as the two angles of an arbitrary line of the object against an x,y,z axis coordinate system, e.g., a spherical coordinate system uses two angles to define a vector's alignment (direction).

During the layer-by-layer deposition, by adding more of the new filaments 9, there will one or more existing deposition layers 13 as well as an additional new filament 9 which can be placed on top of the existing deposition layers 13. When the printing head 1 passes by, a new filament 9 can be extruded out from the filament output port 2 and be applied atop the existing deposition layer(s) 13. The material compaction control and the filament tension control can be applied to compress and bond the new filament 9 to the existing deposition layer(s) 13 under desired stresses and desired fiber volume fraction, if applicable. The field 7 can be used to control the compaction and the tensioner 10 can be used to apply the tension to the new filament 9. Multiple clamps formed by multiple sets of localized pressing surfaces 6 and backing articles 8 can also help to control the position, shape, and deformation of the existing deposition layers 13 while the new filament 9 is compressed and bonded to the existing layers 13 by a set of pressing surface 6 and backing article 8.

In accordance with another exemplary system, the existing deposition layer(s) 13 can also be created by other deposition methods or preferred manufacturing methods other than 3D printing as an insert to be incorporated as a part of the 3D printed part. This practice allows other materials and functional objects with preferred manufacturing methods (due to cost, quality, functionality, etc.) to also be used in the 3D part printing by the printing head 1. A suitable example of such a scenario is the incorporation of functional modules, such as a wireless sensor module or an actuator module, into the 3D part. Many functional modules are typically preferred to be assembled & tested ex vivo to before being incorporated into the 3D printed part. Sometimes, the wireless sensor module can also help the printing process by sensing the parameters during 3D printing process. In many situations, the sensor module can also be used after the printing process during the part's life cycle. Suitable examples of parameters which can be detected by the sensor module include, but are not limited to, stress, strain, electrical properties (like dielectric constant and conductivity), thermal properties (e.g., the use of a tiny hot wire method to measure the thermal conductivity or specific heat), mechanical properties (e.g., roughness and hardness), coordinates (i.e., location) and/or angles (e.g., using GPS, accelerometers, direction sensor, etc.), pressure, temperature, humidity, chemical contents, acoustic characteristics (e.g., sonic index of refraction or reflectivity), density, radiopacity, and sensor identity number (to distinguish it from other sensor modules in the printed part). Suitable examples of parameters or excitation of the actuator modules generated that will affect the function of the 3D printed part include, but are not limited to, stress, force, strain, heat, sound, electrical wave, and magnetic wave.

In one exemplary arrangement, it is preferred to control the relative position of a localized pressing unit 4 with respect to the printing head 1. In this arrangement, there is a relative position controller 14 to control the relative position of the localized pressing unit 4 with respect to the printing head 1.

To further enhance the printing resolutions, the localized pressing surface 6 may have different shapes. In one exemplary system consistent with the present disclosure, the printing head 1 can replace different shapes of localized pressing surfaces 6. In another exemplary system, the localized printing unit 4 can adjust the shape of the localized printing surface 6. For explanation purpose but not for limitation, the localized printing surface can change from a flat surface to a curved surface, such as concave, convex, or saddle surface, to create more details for the printed part. The change can be effected by replacing different printing pads or using actuator-deformed flexible membranes to form the localized printing surface.

In accordance with another exemplary arrangement, multiple localized pressing units 4 can be used in the printing head 1. In accordance with another exemplary arrangement, multiple localized pressing pads 5 can be used in the printing head 1. In accordance with another exemplary arrangement, multiple localized pressing pads 5 can be used in a localized pressing unit 4. In accordance with another exemplary arrangement, a localized pressing pad 5 can have multiple localized pressing surfaces 6. In accordance with another exemplary arrangement, a localized pressing pad 5 can have one or more rotating elements such as cylinder rollers or ball rollers.

In accordance with one exemplary system consistent with the present disclosure, the backing article 8 can be attached to the 3D printed part 103 and is a part of the 3D printed part 103. In another exemplary system consistent with the present disclosure, the backing article 8 can be a detached from the 3D printed part 103. In another exemplary system consistent with the present disclosure the backing article 8 is pre-manufactured before the printing process. In another exemplary system consistent with the present disclosure, the backing article 8 is manufactured during the printing process. In another exemplary system consistent with the present disclosure, the backing article 8 can be included in the new filament 9. In another exemplary system consistent with the present disclosure, the backing article 8 can be included in the existing deposition layer 13. In another exemplary system consistent with the present disclosure, the backing article 8 is not included in the new filament 9. In another exemplary system consistent with the present disclosure, the backing article 8 is not included in the existing deposition layer 13.

By way of example only, and not limitation, examples of backing articles suitable for use consistent with the present disclosure include, but are not limited to, small pieces of soft rubber pads filled with steel particles to be supplied as pre-manufactured accessories for the printing head. These small rubber pads can be detached from the 3D printed part 103 and retrieved once the printing process is finished. Such small pieces rubber pads can be re-useable and will not necessarily be a part of the 3D printed part 103 after the 3D printing process. In one exemplary system consistent with the present disclosure, steel fibers or particles may be filled in a certain type of polymer matrix to or from the new filament 9 thereby establishing a new filament which has the dual roles of the new filament 9 and the backing article 8 while just extruded out from the filament output port 2. Later on, a second new filament 9 can be deposited atop the first filament, and the first filament now has the dual roles of the existing deposition layer 13 and the backing article 8. In this exemplary construction, the backing articles 8 become a part of the 3D printed part 103 (if the first filament layer is not removed).

In accordance with another exemplary system, the first filament layer containing steel fibers or particles is removed so long as such removal of the polymer matrix can be achieved without damaging the roles other portions of the 3D printed part. For example water soluble polymer can be used as the polymer matrix of the first steel-filled filament and subsequently dissolved with water after the printing process. In accordance with this exemplary system, different type of polymers in other filaments can be used such that these polymers are not washed away by the water.

In accordance with another exemplary system, the polymer matrix of the first filament is pH sensitive or can be decomposed after being exposed to a certain environment. Those skilled in the art will be aware of other water soluble tooling materials which can also be used for this purpose. The removal of the first filament can be accomplished during the 3D printing process, after the 3D printing process, or during the service of the 3D printed part, e.g., if the first steel-filled filament was left with the 3D part, one can use its magnetic field responsive attribute to help the 3D printed part 103 to be adhesive-bonded with other parts either during assembling process or healing the crack of the bond-line (as an induction heating layer).

In accordance with another exemplary system consistent with the present disclosure, the magnetic responsive attribute can be used to generate clamping force by applied magnetic field. For example, where the printing head 1 is used to print a repair on top of damaged 3D printed part 103 and the damaged part has this magnetic responsive layer (i.e., the backing layer 8) in it, then the printing head 1 can be used to compact and bond new filaments on top of the damaged area to repair the damaged part. In this case, the damaged area may need to be cleaned first before the repair process.

In accordance with another exemplary system consistent with the present disclosure, the new filament for the repair process is the same type of filament as the original filament in the part 103. In accordance with another exemplary system consistent with the present disclosure, the new filament for the repair process is different types of filament than the original filament in the part 103. For example, if the original filament is carbon fiber reinforced epoxy, one can remove the damaged layer and print the same carbon fiber reinforced epoxy for repair. On the other hand, if the damage of the carbon fiber reinforced epoxy layer is minimal such as shallow surface layer crack (such as delamination or splitting) in part 03, one can print and press a resin film filament on the damage area and force the repairing resin to flow into and fill the crack for repairing the part 103.

In accordance with another exemplary system consistent with the present disclosure, the first filament, containing steel fibers or particles, is not left in the 3D printed part. For instance, if the steel fibers or particles somehow interfere with the best optimized function of the 3D printed part. For example, steel will increase the weight of the part and may rust during the service. In addition, stainless steel is expansive and may not fit the cost-effectiveness depending on market analysis.

If the backing article 8 is not included in the new filament 9 nor the existing deposition layer 13, a backing article delivery mechanism can be included in the printing system to place the backing article 8 near the printing head 1 and to be captured by the field 7. By way of example only, and not limitation, backing article delivery mechanisms suitable for use in the present disclosure include, but are not limited to, an assistant robot or arm thereof to deliver the backing article 8 near to the printing head 1, a launcher to launch the backing article 8 to the near target area, a sprayer (or blower) to spray (or blow) small backing articles near the target area, or a very strong field 7 to attract the backing article 8 from a longer distance, or any combination thereof. For example, one can increase the strength of field 7 to pick up the backing article 8 from a nearby tray. Another example is to have an assistant robot (or robot arm) also emit the same field as field 7 to deliver a backing article 8 near the printing head 1 and gradually increase the field strength from printing head 1 to take away the backing article 8. In accordance with another exemplary system consistent with the present disclosure, the process is reversed to allow the printing head 1 to give the backing article 8 to the assistant robot (or robot arm).

The printing head 1 can also address the thermal management and solidification controls of the filament and printed materials. Such controls can be achieved by temperature, heat, UV light, ultrasound, and laser. In accordance with one exemplary system consistent with the present disclosure, the printing head 1 is equipped with at least one cooling component, e.g., a water cooling channel or thermos-electric cooler. In accordance with another exemplary system consistent with the present disclosure, the printing head 1 may be equipped with at least one energy source for heating. Examples of suitable energy sources include, but are not limited to, an electrical heating element, a UV lamp, an ultrasound source heating, an induction heating element, a microwave heating element, or a laser source. Note that if the new filament 9 contains electrically conductive materials, the induction heating could be very effective for uniform and fast heating of the new filament 9 despite the thickness of the new filament 9.

In accordance with one exemplary system, induction heating is used to heat a thick new filament 9 wherein the new filament 9 is electrically conductive. In another exemplary system consistent with the present disclosure, the printing head 1 has the capability to apply preheating or precooling on the existing deposition layer(s) 13 to accomplish the best binding results between the new filament 9 and existing deposition layer(s) 13. In another exemplary system consistent with the present disclosure, the capability of preheating or precooling on the existing deposition layer(s) 13 is used to reduce the process induced residual stress such as thermal stress, stress due to polymer shrinkage, stress due to phase-change induced shrinkage, etc.

In one exemplary system consistent with the present disclosure, the backing article 8 is different than the existing deposition layer 13. However, in another exemplary system consistent with the present disclosure, the backing article 8 can also be the existing deposition layer 13. Thus, the field directly induces the force on the existing deposition layer 13. For example, the suction of vacuum (pressure field) can be used to pull a solid and non-permeable existing deposition layer 13 toward the localized pressing surface 6 and compress and deposit new filament 9 on the solid and non-permeable existing deposition layer 13. Or, if the deposited layer 13 contains a significant amount of iron content, a magnetic field can be directly applied to achieve the same results.

A weak field-induced force may not be able to provide optimal material compaction control and clamping force. Thus, the field-induced force needs to be strong enough to create significant material compaction control and clamping force to achieve the essential capabilities of this disclosure as described hereinabove. In one exemplary system consistent with the present disclosure, the field emitted by the localized field emitter 3 is penetrating through a localized pressing surface 6. In another exemplary system consistent with the present disclosure, the field 7 emitted by the localized field emitter 3 is not penetrating through the localized pressing surface 6. In another exemplary system consistent with the present disclosure, the field 7 emitted by the localized field emitter 3 is applied in the surrounding area and not penetrating through the localized pressing surface 6.

In the event the existing deposition layers 13 is permeable (to a fluid such as air), the field 7, the (vacuum) pressure field and the backing article 8 can be made of a non-porous membrane material. However, it is envisioned that magnetic field and iron containing backing article may be more effective than the pressure field based approach. A combination of using the pressure field together with the magnetic field may be desirable to create a more capable control on the backing article 8.

It may be desirable to 3D print hollow objects. In accordance with one exemplary system consistent with the present disclosure, the backing article 8 can be enclosed in a cavity between a new filament 9 and existing deposition layers 13. This would create an open hollow gap between the printed deposition of the new filament 9 and the existing deposition layer 13 thereby enabling a 3D-printing hollow envelope/cavity. The backing article(s) 8 enclosed in the cavity can be left inside the 3D printed object or be removed after the part being printed. For example, if one uses small stainless steel balls as the backing articles 8, and use the backing articles to print a hollow 3D part, one can retrieve the balls through a small opening through the hollow 3D printed part.

The localized pressing pad 5 and the localized pressing units 4 can also incorporate many additional features. The localized pressing pad 5 can have a porous character or several vacuum channels to help to draw vacuum or remove excessive resin matrix or air (or volatile gases). The localized pressing unit 4 can also have sensors to detect physical or chemical properties of the new filament 9 and the existing deposition layer(s) 13 and the bonding interface between them. Properties suitable for use in the present disclosure includes, but are not limited to, material hardness, void, temperature, degree of cure of the polymer matrix, thickness, fiber volume fraction, modulus, and rheological behaviors. Sensors suitable for use in the present disclosure include, but are not limited to, ultrasound sensor, acoustic emission sensor, thermocouple, dielectric sensor, material hardness sensor, and a small microscope lens/camera.

The printing head 1 can also incorporate sensors. For example, the printing head 1 can incorporate a thermography camera for monitoring the temperature close to the printing area and assisting the heating and cooling management (including pre-heating and pre-cooling). The printing head 1 can also incorporate a sensor capable of determining its position in the space in which it is printing the part. For example, a vision sensor can allow the printing head 1 detect its relative position to avoid hitting (or interfering with) the surroundings inside a confined working space where it is assigned to print the new 3D printed part. One of the key features of the present disclosure is there is no need for a platform or support medium chamber. This is significant because it allows for the capability of printing 3D parts onsite rather than first printing the 3D part offsite and subsequently shipping the part to the site. Accordingly, the onsite 3D printing capability of the present disclosure will be very helpful for such practical scenarios. In addition, if the 3D printed part needs to be modified according to the conditions of the site, the onsite printing capability can achieve so easily.

In accordance with one exemplary system consistent with the present disclosure, the printing head 1 adds the mechanisms to interact with a 3D printed part 103 through one or more functional modules embedded or deposited into the part, e.g., the addition of a sensor or/and actuator module or small particle or fiber capable of responding to a signal or field emitted by the printing head 1. The particles or fibers may be placed in any pattern that is amenable to rapid identification, such as a bar code, QR code, linear code, etc. One example is to obtain the temperature inside the part (as opposed to the surface temperature) measured by the module during the printing process. Another example is to utilize an identification reading mechanism to retrieve the identification numbers of some modules, the modules being placed at strategic locations and designed to assist in locating key locations of the part during the 3D printing process and/or later-on assembly and/or secondly-processing (like cutting, trimming, etc.). Any other parameters collected from the module can be used for assisting the manufacturing process and can be registered under the unique module identification number. If each 3D printed part 103 has the modules with unique module identification numbers, one can record the complete manufacturing history of the 3D printing part 103 and use the data as a reference for quality control, service, and repair.

In another exemplary system consistent with the present disclosure, the aforesaid mechanism (for the printing head 1 to interact with the 3D printed part 103 through one or more functional modules) can be used as security protection. First, without getting these modules for matching the printing files, others will not be able to successfully print the 3D part (even if they have the printing file) without first getting the authentic modules from the 3D part design IP owner if the interaction mechanisms between the printing head 1 and the 3D printed part 103 is a necessary steps during the 3D printing and later assembly, service, or repair. Second, if a hacker maliciously changes the design file of the 3D printing, the chances of matching all key modules and the history of recorded associated with the module identification numbers within desired manufacturing tolerance is still very low and, in any event, can be readily detected by the manufacturing system. For example, if a hacker altered the printing head 1 moving path so that the filament deposition path is altered so it is moving from module A to module C instead of an originally designed path of moving from module A to module B, then the temperature history registered by modules A, B, C under hacker-altered printing path will be obviously different from the temperature history registered by modules A, B, C under original design with significantly different heating sequence/timing. If one also include more physical parameters in the history such as dielectric properties, ultrasound responses, etc., it will be even easier to detect if the path is being maliciously altered. If one deploys ten (10) such functional modules, it will be extremely difficult to maliciously alter the printing path and still see these faulty parts being printed without being discovered by the system. For example, if a carbon fiber composite part is printed, its original ply sequence (i.e., fiber direction of each ply) is generally carefully designed to achieve certain criteria in elastic responses (vibration, fatigue, ply-associated failure modes, etc.) with respect to certain loading environment. Additionally, for example, if a hacker altered the inner layers' fiber directions and kept visible surface layers' fiber directions unaltered (for a typical composite of 3 mm thick airplane skin which about 30 layers or more fiber layers) it will be extremely difficult to detect by any test without fracturing and testing the part sections by sections. This, more than likely, would be more expansive and time consuming than building a new part. The security enabled by this embodiment of the present disclosure would be very helpful in stopping a hacker's malicious attacks in altering the printing file and printing without authorization.

An exemplary embodiment of a method of verifying the intellectual property compliance in a 3D printed workpiece comprises printing an ID module in the workpiece during the printing of the workpiece using a 3D printer. The ID module is then read to obtain an ID code, which is transmitted to an authentication server. An authentication signal is then received from the authentication server indicating positive or negative authentication. Depending on when the ID module is read the method can be used for various types of intellectual property verification.

For example, the ID module may be read during the printing process as a means of ensuring that the design for the workpiece is not a pirated copy. Once the ID module has been printed, it is read, and the ID code is verified with the authentication server to ensure that the design file is used by an authorized user. If the authorization signal is positive, printing can continue. If it is negative (meaning that the design file was pirated), printing halts. Additional responses to a negative authorization signal may be used, such as overwriting the pirated design file to destroy it, sending a piracy notice to a third party, causing the printing head to destroy the portions of the workpiece that have already been printed, or overwriting the firmware of the 3D printer.

A positive authentication signal can trigger additional actions. For example, the licensee associated with the ID code can be identified, and a royalty charge can be accrued to the licensee's account for printing the workpiece. As another example, a record could be made of an authorized workpiece that can be consulted by parties in the chain of custody of the workpiece (e.g., buyers who wish to authenticate the goods).

The method can also be used to conduct automated quality control (QC), to check for unexplained design deviations in the workpiece. In such methods, the structure and dimensions of the workpiece can be checked by determining the locations of one or more modules and reporting the locations to a QC server, which ensures that the workpiece has been correctly manufactured. For example, in some embodiments of the method the first ID module is printed at a first location in the workpiece, and a second ID module is printed at a second location in the workpiece. The locations of the first and second ID modules are then detected by the printer or another local device, and the locations are transmitted to the QC server. The QC server then compares the locations of the first and second modules in the workpiece to their intended locations in the design of the workpiece, and sends a QC confirmation signal. This approach can be used to account for defects in the workpiece arising from multiple causes, such as defects in the printer hardware, defects in the printer software, bad copies of the design file, and even malicious tampering with the printer software or the design file. Generally some deviation will be acceptable, within certain tolerance ranges. In some embodiments of the method the QC confirmation signal communicates whether the relative locations of the first and second ID modules are within a tolerance range of the design specification for the relative locations of the first and second ID modules.

The method can also be used by a party that who acquires the workpiece in the flow of commerce to verify that the workpiece is not an unauthorized imitation ("counterfeit"). In such versions of the method the ID module is read by the party that acquires the workpiece, and the ID code is sent to an authentication server. The authentication server checks the ID code for indications of counterfeiting. Such indications could include that the ID code has already been reported for a different workpiece, lack of any record that the ID code was ever used for an ID module in a licensed workpiece, and a record of the ID code being associated with a counterfeit workpiece. If one or more indications of counterfeiting are found, a counterfeiting signal may be sent back to the acquiring party.

In any embodiment of the method involving communications between the printer and a remove server (e.g., the authentication server and the QC server), security measures can be put in place to authenticate the sender and/or receiver or to encrypt the communications. For example, either or both parties can send a secure certificate that authenticates the identity of the sender. Furthermore, any signal may be encrypted using a private key of the sender, and wherein the signal can be decrypted using a public key of the sender.

In a specific embodiment consistent with the present disclosure, for adding more relative motion control of the printing head 1 on the 3D printed part, one or more assistant roller(s) 15 may be added onto the printing head 1. In one exemplary system, the assistant rollers 15 are connected to the printing head 1. In another exemplary system, the assistant rollers 15 are connected to localized pressing unit 4, if appropriate. The assistant roller(s) 15 can be moved to push against the 3D printed part 103 on the existing deposition layer 13 or/and on the new filament 9 to assist in reducing and controlling the pressure on the localized pressing surface 6. Another major use of the assistant rollers 15 is to control the precise thickness of the new filament 9, by controlling the precise gap (i.e., distance) between the localized pressing surface 6 and the existing deposition layer 13. When necessary, the assistant rollers 15 can also assist in lifting the localized pressing pad 5 away from the surface of the 3D printed part 103. In one embodiment of the present disclosure, at least one assistant roller(s) 5 is driven by one or more than one motors. Thus, the assistant rollers 15 can control the additional push or drag force to the print head 1 moving on the surface of the 3D printed part. Such push or drag control by the assistant rollers 15 can also assist the tensioner 10 and printing head position control mechanism 12 to control the tension applied to the new filament 9. The assistant rollers 5 are preferred to be motorized.

The printing head 1 can handle one single new filament 9 or more than one new filament 9. The printing head 1 can have a single new filament output port 2 or more than one filament output port 2. It can use one type of new filament 9 or more than one type of filament 9.

A Novel Printing Method and System Enabled by the Printing Head

Figure 3A:
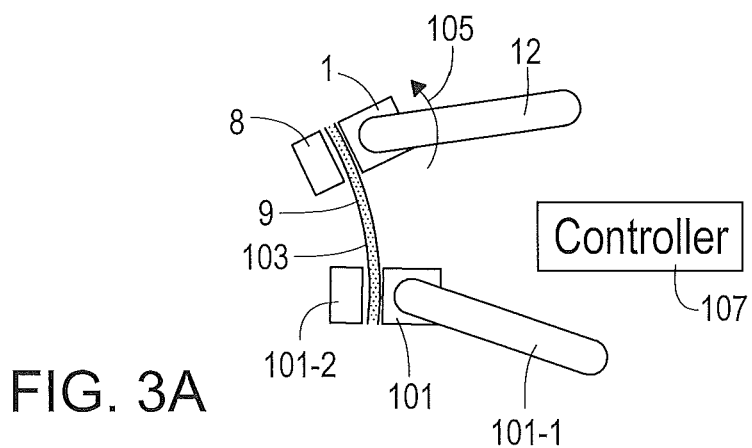
FIG. 3A and FIG. 3B are illustrations of an embodiment of the method of using the printing head to print a curved-shaped part.
Figure 3B:
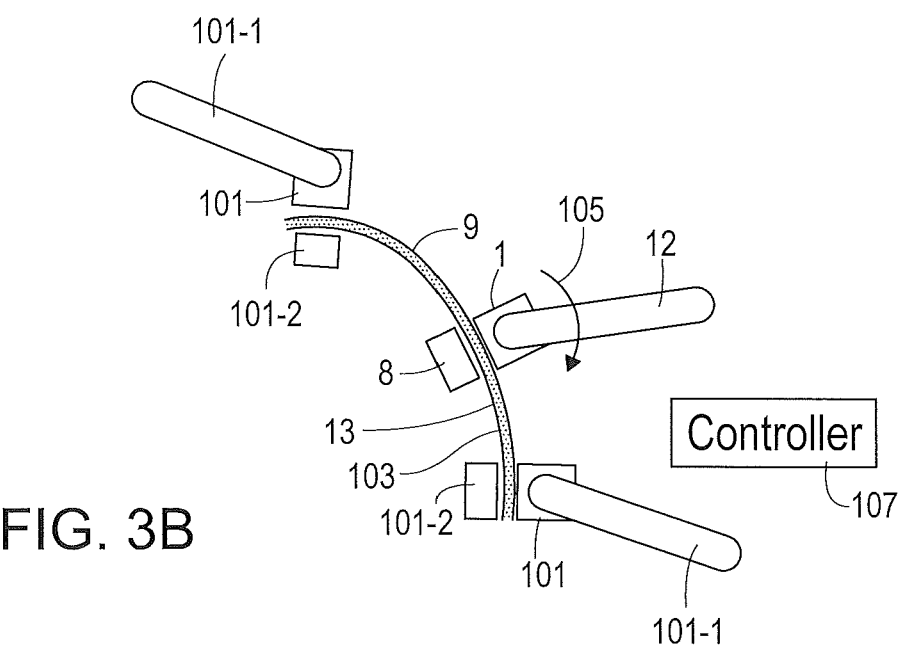

The printing head 1 takes a different 3D method in comparison to traditional 3D printing methods and allows for the direct printing of filaments (in general) into a 3D part without relying on a platform or a support medium chamber (which is required in other additive manufacturing methods). In one exemplary practice consistent with the present disclosure, a novel free-form curved-structure (FFCS) printing method is described herein below. FIG. 3A and FIG. 3B) are used for explanation purposes only and in no way are intended to limit the present invention.

FIGS. 3A and 3B illustrate how to use the printing head to print a curved-shaped part. Element 1: printing head 1; in FIGS. 3A and 3B, it is also assumed with all its functions described previously disclosure.

Element 8: backing article, which is responsive to the field 7 and can work together with field 7 to generate field-induced force on the backing article.

Element 12: printing head position control mechanism such as a robot arm to control the position (coordinates & angles) of the printing head 1.

Element 101: anchor units, which are used to secure the 3D printed part 103 being printed during the 3D printing process.

Element 101-1: anchor position control mechanism to control the position of the anchor unit 101. It can be a robot arm, a truss secured to ground or the surrounding environment, etc.

Element 101-2: coupling pad to help the anchor unit to hold the printed part. It can be used to provide effective clamping force to clamp the 3D part 103 between the anchor unit 101 and itself.

Element 103: 3D printed part; it can be a portion of the part under printing when is still during the 3D printing process.

Element 105: the moving direction of the printing head 1.

Element 107: controller for controlling the printing head 1 and the printing head position control mechanism 12.

To print a 3D part 103, one or more printing heads 1 first supply a section of new filament 9 with one end that is secured by the anchor unit 101 as shown in FIG. 3A. The anchor unit 101 has the anchor position control mechanism 101-1 to precisely control its position. A coupling pad 101-2 can be used to help the anchor unit 101 to effectively clamp the solidified new filament 9. The print head 1 is works by emitting the field 7 from a localized field emitter 3 to control at least one backing articles 8 to working with at least one localized pressing unit 4 to control the position (i.e., coordinates and angles) and compaction of the new filament 9 and shape it and solidify it as the features described hereinabove so that the new filament 9 once leaving the printing head 1 is solidified with desired shape and compaction. Note one can also control the tension of the new filament 9 as described hereinabove. By moving the printing head 1 and spinning out and solidifying more new filament 9 gradually along the designed path in 3D space under the shape and compaction control by the localized pressing unit 4 and field emitter 3 of the printing head 1, one can produce more layers of deposition of the 3D part 103. By repeating the procedure with a gradually evolved printing path to deposit more new filaments 9, one can grow the 3D printed part 103 and deposit more new filaments 9 to the top of the existing deposition layers 13 as shown in FIG. 3B. Multiple sets of anchor units 101 can be used to better support the 3D printed part 103 when appropriate as shown in FIG. 3B. When the 3D printed part 103's size becomes too large for a single anchor unit 101 to hold, multiple sets of anchoring systems are very helpful and cost-effective compared with a single set of strong and expansive anchoring system.

In accordance with one exemplary practice, the anchor unit 101 can use a localized field (such as a magnetic field) to attract the coupling pad 101-2, to thus provide strong clamping capability. In accordance with another exemplary practice, the anchor unit 101 can move its anchoring position at the 3D printing part 103 by releasing (or reducing) the clamping force in order to move the anchor unit 101 to a different relative position of the 3D printed part 103 and resume its strong clamping force to secure the 3D printed part 103. In accordance with another exemplary practice, a printing head 1 can also be used as the anchor system to secure the 3D printed part 101. By appropriately controlling the printing head 1 to move along each designed new filament 9 placement path and compress the existing deposition layers 13 against the extruded new filament 9 as described, along with the support from the anchor units 101, a 3D part 103 can be printed without using any mold or support medium chamber.

In accordance with one exemplary practice, the 3D printing system has one printing head 1. In accordance with another exemplary practice, multiple printing heads 1 can work together for the 3D printing. For example, one can have x number of printing heads 1 to be controlled by x number of robot arms (x can be 1, 2, 3 . . . etc.) to work together under the commands of a controller 107 or the coordinated commends of multiple controllers 107. Each printing head 1 can play the role for depositing new filaments 9, serving as an anchor unit 101, interacting with the embedded functional modules (such as a wireless sensor module or an actuator module), sensing the manufacturing parameters of the 3D printed part, sensing the surrounding environment (such as through aforementioned vision sensor and thermography camera), sending information to the controller 107, or any combination thereof. In accordance with another exemplary practice, the controller 107 can analyze the design of the part to be printed and generate optimized commends to operate either single printing head 1 or multiple printing heads 1 for printing the 3D part.

If the backing article 8 is not included in the new filament 9 nor the existing deposition layer 13, a backing article delivery mechanism, which helps to place the backing article 8 near the printing head 1 can be included in the printing assembly to let the backing article 8 be captured by the field 7, Suitable examples of backing article delivery mechanisms include, but are not limited to, assistant robot, e.g., drone, (or robot arm) to deliver the backing article 8 near to the printing head 1, a launcher to launch the backing article 8 to the near target area, a sprayer (or blower) to spray (or blow) small backing articles near the target area, a very strong field 7 to attract the backing article 8 from longer distance, and any combination of the aforementioned approaches. In one exemplary practice, the anchor unit 101 can use a localized field (such as a magnetic field) to attract the coupling pad 101-2, wherein the coupling pad 01-2 can be delivered by as method same as the backing article delivery mechanism.

In some situations, some materials could be heavy and soft thus the solidified filament and layers couldn't support themselves when the thickness of the part is thin and at least one of the other dimensions (i.e., length and width) are long. In other words, it is sometimes possible that a certain portion of the 3D printed part 103 could be saggy and not stiff enough to hold its relative position. This can be mitigated by using more anchor units 101 to reduce the span between two anchored locations. If design modification is allowed, it will be better to print in a way that the stiffness of printed portion (typically increasing the thickness will make the portion stiffer) grows strong enough before moving to increase the length and width. On the other hand, one important feature of the printing head 1 is that it already has an implied solution for handling this concern. As previously mentioned, the printing head 1 can use an identification reading mechanism to retrieve the identification numbers of some modules which are placed at strategic locations and designed to help to locate important locations of the part during the 3D printing process (or/and later-on assembly or/and secondly-processing, e.g. cutting, trimming, etc.). Since one can relate the modules identification numbers with the corresponding correct positions in the part design file, one can still print new filament 9 on top of the saggy existing deposition layer 13 by following the designed path near the modules and use the backing article 8 to return the saggy existing deposition layers 13 back to the correct position to be bonded with the new filament 9.

In accordance with one exemplary practice, results can be further enhanced by adding multiple printing heads 1 or multiple movable anchor units 101 to perform the local stretch and position control of the material of the saggy (or soft) 3D part 103 near the designed place of the new filament 9 to be deposited on. The purpose is to form a piecewise precisely positioned and well expanded plane from the saggy 3D part for the printing head 1 to work on. Each printing head 1 can also be equipped with multiple localized pressing units 4 that can move relatively. The multiple localized pressing units 4 can also provide similar contribution as using multiple printing heads 1 or multiple movable anchor units 101. In addition, the motorized assistant rollers 15 can also help to precisely move a saggy part under the localized pressing unit 4. As such, the printing head 1 method can enable the printing of a 3D part made in any portion of soft materials in the absence of the any mold nor support medium chamber.

In accordance with another exemplary practice, a controller 107 is used to process the designed 3D printing procedure of the part 103 and control the printing head position control mechanism 12 and the printing head 1 (which includes the filament output port 2, the field emitter 5, and the localized pressing unit 4) to successfully print the 3D part 103. In one exemplary practice, the controller 107 is used to control at least one set of anchor units 101 and anchor position control mechanisms 101-1. In another exemplary practice, the controller 107 analyzes the data sensed by the printing head 1 and compares the data with the original design for necessary adjustment in its next step control commands. By way of example only, the data sensed by the printing head 1 may include the identification numbers of at least one functional module embedded in the 3D printed part 103. In accordance with another exemplary practice, the controller 107 records the data sensed by the printing head 1 into the processing history data of the 3D printed part 103. In accordance with another exemplary practice, the processing history data of the 3D printed part 103 includes the parameters corresponding to at least one functional module.

In addition to printing new 3D parts, this method is also applicable for repairing damaged parts, given the backing articles 8 or equivalent (that can create the effective field-induced force to compress and bond the new filament 9 to the damage part) is presented at the damaged area of the part. For example, if the backing article 8 is included in the existing deposition layer 13 of the damaged part, one can use the printing head 1 to print new filaments 9 on the damaged part to repair or retrofit the damaged part; wherein the backing article 8 and the printing head 1 work together to compress and bond the new filament 9 to the damaged part on the damaged area. Note that prior cleaning and surface treatment (such as surface sanding or debris removal) may be needed before the 3D printing-repair. On the other hand, if the backing article 8 is not included in the existing deposition layer 13 of the damaged part, in order to achieve the same effect of compression and bonding as aforementioned, one can supply at least one backing articles 8 with the damaged part to work together with the printing head 1 to print new filaments 9 on the damaged part to repair or retrofit the damaged part. In accordance with one exemplary practice, this method can be used for manufacturing new parts. In another exemplary practice, this method can be used to repair damaged parts.

Of course, variations and modifications of the foregoing are within the scope of the present disclosure. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expect skilled artisans to employ such variations as appropriate, and the inventor intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The following is claimed:

1. A printing head for a 3D printing assembly comprising:
   (a) a filament output port connected to receive an unsolidified printing material from a feedstock processor and extrude a filament comprising the unsolidified printing material onto a substrate;
   (b) a pressing surface positioned to contact the filament once the filament is extruded; and
   (c) a field emitter configured to emit a field to attract a backing article toward the pressing surface to compress the filament between the substrate and the pressing surface, wherein the field emitter emits a field selected from: magnetic, electrostatic, fluid pressure, and a combination of two or more of the foregoing.

2. The printing head of claim 1, wherein the backing article is the substrate.

3. The printing head of claim 1, wherein the substrate is positioned between the backing article and the filament.

4. The printing head of claim 1, comprising a tensioner positioned to exert tension on the filament between the output port and the pressing surface.

5. The printing head of claim 1, comprising a cutter positioned to cut through the filament after extrusion from the output port.

6. The printing head of claim 1, comprising an ultraviolet light source positioned to illuminate the unsolidified printing material after extrusion.

7. The printing head of claim 1, comprising a cooling unit positioned to cool the unsolidified printing material after extrusion.

8. The printing head of claim 1, comprising a suction unit positioned to remove excess unsolidified printing material after extrusion.

9. The printing head of claim 1, comprising a resin bleeding channel positioned to remove excess unsolidified printing material after extrusion.

10. The printing head of claim 1, comprising a resin bleeding fabric positioned to remove excess unsolidified printing material after extrusion.

11. The printing head of claim 1, wherein the field emitter is configured to emit the field to impart an attracting force vector that is approximately perpendicular to the pressing surface.

12. The printing head of claim 1, wherein the field emitter is configured to emit the field to alter and maintain the shape of the backing article.

13. The printing head of claim 1, comprising a position controller connected to the printing head to cause the printing head to translate while allowing the pressing surface to remain approximately parallel to the backing article.

14. The printing head of claim 1, comprising a roller positioned to contact the substrate and maintain a set distance between the substrate and the printing head.

15. The printing head of claim 1, comprising a sensor positioned to visually monitor the filament after extrusion.

16. The printing head of claim 1, comprising an actuator to rotate the printing head, translate the printing head, or both.

17. The printing head of claim 1, wherein the filament contains a reinforcing fiber that is at least 1 mm in length.

18. The printing head of claim 1, wherein the filament contains a reinforcing fiber that is composed of a shape memory material.

19. A 3D printing system for printing a workpiece, the system comprising:
   (a) the printing head of claim 1; and
   (b) a first anchor unit configured to clamp the filament between a clamping surface and a coupling pad on said anchor unit, the anchor unit comprising an anchor position controller configured to maintain a position of the anchor unit relative to the printing head.

20. A method of producing a workpiece by 3D printing, the method comprising:
   (a) extruding a filament containing an unsolidified printing material on a substrate;
   (b) emitting an attractive field to attract a backing article so as to compress the filament between the substrate and a pressing surface, wherein the attractive field is selected from: magnetic, electrostatic, fluid pressure, and a combination of two or more of the foregoing;
   (c) solidifying the unsolidified printing material to create a solid printing material; and
   (d) advancing the 3D printing head relative to the filament.

21. A method of repairing a workpiece using a 3D printing head, the method comprising:
   (a) extruding an unsolidified printing material from a 3D printing head onto a damaged area of the workpiece;
   (b) emitting an attractive field to attract a backing article so as to compress the unsolidified printing material between a substrate and a pressing surface, wherein the attractive field is selected from: magnetic, electrostatic, fluid pressure, and a combination of two or more of the foregoing;
   (c) solidifying the unsolidified printing material to create a solid printing material; and
   (d) advancing the 3D printing head relative to the workpiece.

* * * * *